March 5, 1929.     J. C. LEARY     1,704,393
CONNECTING ROD
Filed May 6, 1925
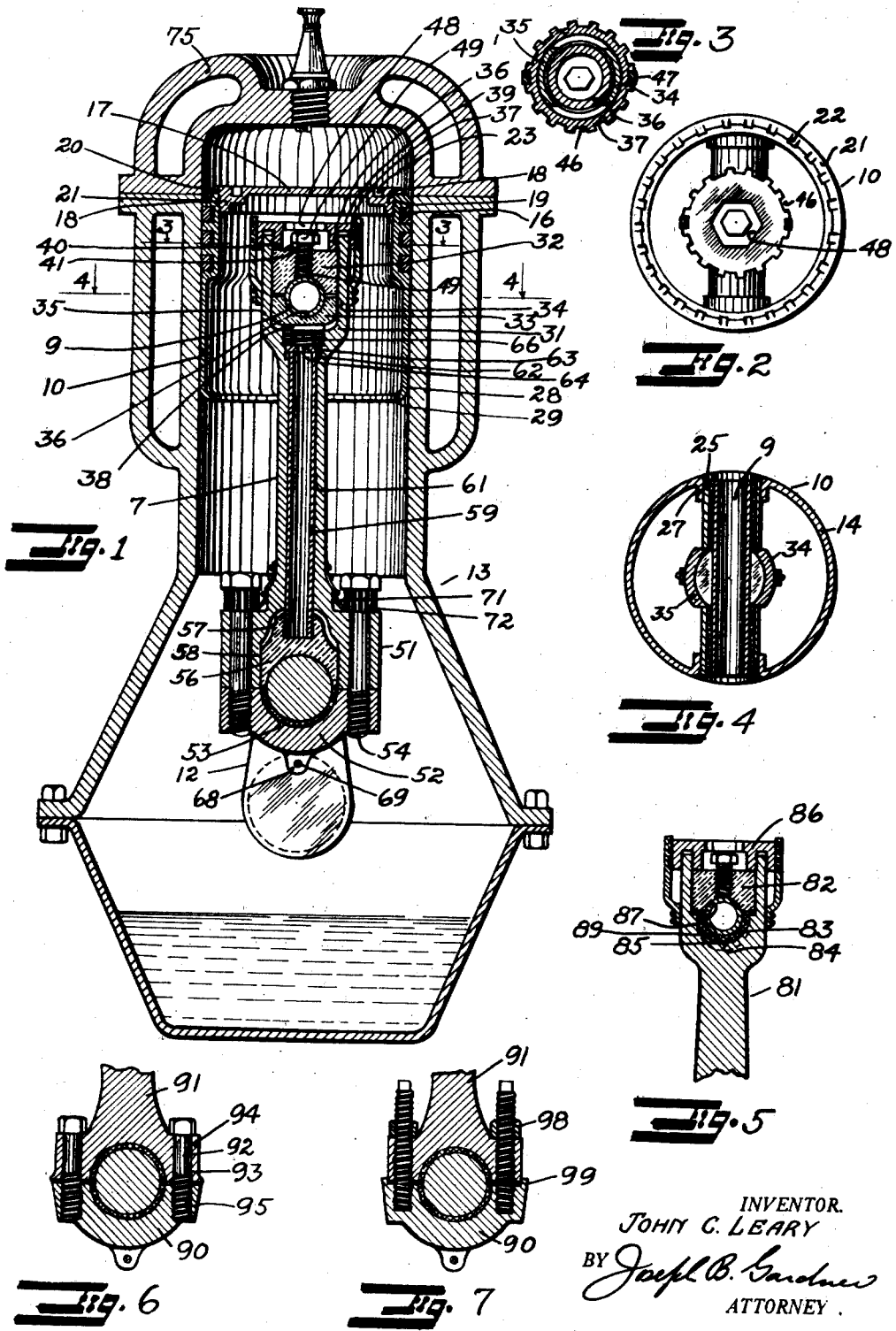
INVENTOR.
JOHN C. LEARY
BY Joseph B. Gardner
ATTORNEY.

Patented Mar. 5, 1929.

1,704,393

UNITED STATES PATENT OFFICE.

JOHN C. LEARY, OF SAN FRANCISCO, CALIFORNIA.

CONNECTING ROD.

Application filed May 6, 1925. Serial No. 28,420.

My invention relates to connecting rods arranged to be disengaged from the wrist-pin of a piston while the piston remains in the cylinder.

An object of the invention is to provide a connecting rod of the character described arranged to have one or all of the various parts thereof removed or adjusted from the head end of the cylinder without necessitating removal of the engine crankcase.

Another object of the invention is to provide a connecting rod of adjustable length whereby the clearance space of the engine may be varied.

A further object of the invention is to provide a piston and connecting rod structure which is extremely light and yet possesses the requisite strength.

The invention possesses other objects and features of advantage some of which with the foregoing will be set forth in the following description of the preferred form of my invention which is illustrated in the drawings accompanying and forming part of the specification. It is to be understood that I do not limit myself to the showing made by the said drawings and description as I may adopt variations of the preferred form within the scope of my invention as set forth in the claims.

Referring to said drawings:

Figure 1 is a sectional view of one cylinder of an internal combustion engine equipped with connecting rod of my invention.

Figure 2 is a top view of the piston shown in Figure 1 with the piston top end portion removed.

Figure 3 is a sectional view of the connecting rod taken on the line 3—3 in Figure 1.

Figure 4 is a sectional view of the connecting rod and piston taken on the line 4—4 in Figure 1.

Figure 5 is a side sectional view of the piston end of a modified form of the connecting rod of my invention.

Figures 6 and 7 are side sectional views of the crank pin ends of modified forms of the connecting rod of my invention.

One of the most awkward jobs in the repair or adjustment of internal combustion engines of the vertical cylinder type is work involving the pistons or connecting rods of the engine. The difficulties usually met in such work do not usually reside in the mechanical manipulation involved but rather in the problem of getting at the parts to be worked on by reason of the fact that in engines of the types in most common use the connecting rod bearings may only be reached from the crankcase end of the cylinder which is usually the lower end. Such an arrangement as is well known makes it necessary for the mechanic to work from a pit or from a recumbent position and thus interferes with the progress of the work to be done. In accordance with my invention however I provide a piston and associated connecting rod by the use of which the foregoing difficulty is overcome, to thereby eliminate any necessity for the assumption of an awkward working position by the mechanic. Briefly, the device of my invention comprises a connecting rod having the portions thereof releasable from their various operative relationships with each other, the piston and the crank pin, through the cylinder and from the head end thereof, so that work thereon may be performed entirely from above. The device is arranged for use with a piston having a removable head and is so constructed that removal of the piston head will give access to the end of the rod for adjustment, or release from the wrist pin or the crank pin, as may be desired.

As here shown, the connecting rod 7 of my invention is operatively disposed in an engine cylinder between the wrist-pin 9 of the piston 10, and the crank-pin of the crank shaft 12 of an internal combustion engine 13. By forming the wall 14 of the piston of pressed steel or steel tubing, a light weight piston wall structure possessing requisite strength and at the same time providing a maximum space for mounting a connecting rod bearing, will be provided. The piston wall is provided with the usual piston ring grooves 16 in its outer surface and is arranged to have a head member 17 preferably formed of aluminum or pressed steel, removably fixed thereto. As here shown, the head 17 is arranged to be secured to the piston wall by means of the cooperative engagement of an externally threaded integral annular flange 18 extending transversely from the head with threads 19 provided at the head end of the piston wall, it being noted that when the piston head 17 is screwed into position, the bevelled edge 20 thereof will seat against the head edge 21 of the piston wall. Means are preferably provided for preventing the unscrewing of the piston head, and as here shown such means comprises the provision of notches 22 in the piston wall edge 21 into which overlying portions of the edge 19 of the piston head may be slightly peened or otherwise caused to offset. Removal of the piston is here shown arranged to be effected by the provision of oppositely disposed sockets 23 adjacent the edges of the head arranged for the reception of the prongs of a fork-wrench, the offset portions of the head edge being preferably first raised.

In forming the piston of thin metal as here shown, mounting of the wrist-pin bushings 25 which carry the wrist-pin 9, which is preferably tubular, is provided by punching the shell at opposite points to provide inwardly extending flanges or burrs 27 to which the bushings 25 may be welded or brazed, and reinforcement of the lower edge 28 of the piston is preferably effected by rolling the edge inwardly to form a flange 29. In this manner it will be noted that a piston of particularly light weight and durable structure has been provided, and it will be further noted that access to the interior of the piston from the head end may be simply effected by removal of the piston head 17 as hereinbefore provided.

As here shown, the head end 31 of the connecting rod is forked to span the wrist-pin, cooperating bearing blocks 32 and 33 being slidably mounted between the fork portions 34 and 35 and longitudinally separable from each other along the line of the transverse diameter of their bore 36, the latter being arranged to closely encircle the wrist-pin. The bearing blocks are here shown arranged to be held in desired engagement with the wrist-pin by engaging them between a thrust member 38 arranged to be seated in the crotch of the fork and a screw-cap 39 engaging the threaded extremities of the fork portions 34 and 35, the latter being of such width that proper holding engagement of the cap and fork may be insured. As here shown, the cap is formed with concentric annular flanges 36 and 37 extending from the same side thereof, the outside surface of the inner flange 36 being here shown threaded to engage the correspondingly threaded inner surface of the fork extremities and the outer flange arranged to slidably engage the outer surfaces of the fork extremities. The flange 36, it will also be noted, is arranged to have its edge 40 bear on the top surface 41 of the upper bearing block 32, so that as the cap is screwed into position, the outer block 32 may be forced against the wrist-pin with any desired force. In this manner, it will now be noted, the engagement of the wrist-pin between the bearing blocks may be simply effected, and the cap, owing to the outer flange 37, will prevent the spreading apart of the fork portions 34 and 35. To hold the cap fixed against rotation, the former is here shown provided with a serrated edge 46 which is arranged to be engaged by oppositely disposed springs 47 suitably mounted on the rod end. Manipulation of the cap by a mechanic is arranged to be effected by providing in the top thereof a square or hexagonal hole 48 arranged to receive a correspondingly shaped key of a key wrench. In this manner, it will now be noted, a head end bearing structure for the rod has been provided which may be readily assembled, adjusted, or removed, such operations all being possible of accomplishment through the head end of the cylinder and piston. It will also be further noted that varying the thickness or shape, or positioning of the thrust member 38 will vary the effective length of the connecting rod, and a simple means is thus provided for adjusting the clearance in the engine cylinder. To facilitate handling of the block 32, a threaded bolt-hole 49 is here shown provided in the block 32 in which a stud bolt may be inserted when the block 32 is to be manipulated. The hole 49, it will be noted, if extended to the bore of the bearing as shown, may also serve as a passage for lubricating oil for the bearing during the operation of the engine.

In the embodiment shown in Figure 1, means are also provided for adjusting the crank pin bearing from the head end of the cylinder. As here shown, the crank end 51 of the connecting rod is provided with a bearing cap 52 carrying a half-bearing 53 therein, the cap being secured to the rod by means of bolts 54. The remainder of the bearing for the crank pin is provided in a bearing block 56 mounted for limited longitudinal movement between the cap and the crotch 57 of a fork 58 defined in the crank end of the rod. Adjustment of the position of the bearing 56 is arranged to be effected through a thrust rod 59 here shown of tubular section and in threaded engagement with the block 56, and extending longitudinally through a bore 61 provided in the rod to a point adjacent the upper crotch. It will be noted that the crank pin bearing now provided is thus arranged to be adjusted independently of the rod end and cap, which latter may thus be fixed together by the bolts 54 without requiring the use of shims between them. The rod 59 is here shown terminating in an enlarged threaded portion 62 of the bore and is preferably transversely flanged inwardly and outwardly to provide a smooth bearing 63 at the upper end thereof to limit its downward movement through the bore 61, and to define an axially disposed polygonal opening arranged for the reception of a correspondingly shaped key wrench.

The exertion of required thrust on the rod 59 is arranged to be effected through the thrust produced on the rod and bearing 63 by a threaded member 64 engaging in the threads of the bore portion 62, it being noted that the member 64 is here shown underlying and supporting the thrust member 38 of the upper bearing structure. To provide for turning of the member 64, the latter is provided with a polygonal perforation 66 arranged to receive a suitable key wrench. Adjustment of the bearing 56 to tighten it or take up wear is thus arranged to be effected by loosening the member 64, unscrewing the rod 59 from the block 56 by an amount approximating the take-up distance, and then screwing the member 64 into its former set position. In this manner, it will now be noted, adjustment is arranged to be simply effected without changing the effective length of the connecting rod, it being understood that the upper bearing blocks and their associated parts must be removed before such adjustment may be made.

In order that it may be held positioned, removed, or prevented from falling into the crank case, the lower cap 52 of the connecting rod is here shown provided at its lowermost portion with a pair of ears 68 connected by a rod 69, the latter preferably lying parallel to the crankpin axis and in spaced relation from the cap. In this manner, a strap may be passed around the lower side of the cap between the rod 69 and the cap for holding the latter as desired, or a suitable tool having a wedge shaped end extending transversely from the shank and arranged to be wedged into the space between the rod 69 and cap may be used. In this manner, it will now be noted, the cap may be positioned and kept from falling into the crankcase when the balance of the connecting rod is disconnected therefrom. The cap bolts 54, it will now be noted, are arranged with their heads toward the piston, so that they may be manipulated from the head end of the rod by means of a socket wrench, and as shown in Figure 1, are arranged to be held fixed, when set, by means of springs 71 fixed on the connecting rod and engaging fluted portions 72 provided on the bolts adjacent their heads. In this manner, it will now be noted, the placing of a wrench socket over the bolt head will depress the springs and so release the bolt for turning.

To completely remove a rod formed as hereinbefore described, the cylinder head 75 of the engine would first be removed and the piston positioned at the top of its stroke. The piston head 17 of the piston 10 would then be unscrewed, after which the screw-cap 39 of the connecting rod would be removed. By the aid of the bolt 49, the block 32 is next lifted out, which now permits removal of the piston. With a supporting device fixed to the lower cap as described, the bolts 54 are then unloosed and the remaining rod assembly may then be lifted off the crank pin as a unit. Assembly of a rod in operative position would, it will be noted, be accomplished in the reverse order to that for its removal, and it will be obvious that only those parts need be removed which permit desired adjustments when adjustment merely is desired.

As shown in Figure 5, the head end of the connecting rod 81 is forked as in the embodiment of Figure 1, but it will be noted that it is provided with only one slidable bearing block 82, the lower wrist-pin engaging member 83 being arranged to fit in a semi-cylindrical seat 84 provided in the crotch 85 of the fork. Provision for adjustment of the crank-pin bearing through the rod, it will be noted, is omitted in this embodiment. As in the other embodiment, a threaded cap 86 is arranged to be mounted on the fork ends and to engage the block 82 in the same manner as does the corresponding cap of the first described embodiment engage one of the bearing blocks. By forming the block 82 and member 83 of suitable materials, the wrist-pin may be allowed to turn in the bore 87 as a bearing, in which case the wrist pin would be arranged to be held fixed in its piston. It will be noted that the member 83 may be formed to have its bearing surface, which forms part of the bore 87, at any desired distance from its seat engaging surface 89, so that the effective length of the rod may be easily changed by substituting a bearing of different thickness longitudinally of the rod.

In Figures 6 and 7 are shown different means for holding the crank-end cap 90 on a connecting rod 91. As shown in Figure 6, cap bolts 92 are utilized, the bolts being arranged to extend through bores 93 provided in the flange portions 94 of the rod to engage in threaded apertures 95 provided in the abutting portions of the cap. Such bolts, it will be noted, are thus arranged to be turnable by a socket wrench applied through the cylinder. In the embodiment of Figure 6, the cap 90 and rod 91 are arranged to be held in fixed relation by means of a reverse threaded bolt connecting them, so that adjustment to take up wear may be simply effected by turning the bolt from above by means of a socket wrench, the bolts being arranged to be held fixed by means of lock-nuts 98 bearing against the rod portion adjacent the bolt and also operable from above. Since the opposed faces of the cap and rod are normally spaced, flanges 99 are preferably, as here shown, provided on the cap edges to provide a guideway or socket for the adjacent rod end.

I claim:

1. In combination with a piston having a removable head and a wrist-pin engaged in said piston, a connecting rod having its head end formed as a fork and having oppositely disposed portions arranged to span said wrist-pin and define a longitudinally disposed guideway therebetween, a bearing member carried by said rod adjacent the crotch of said fork, and a second bearing member slidably and removably engaging in said guideway, said bearing members defining between them a bore in which said wrist-pin is arranged to be disposed.

2. In combination with a piston provided with a removable head, a wrist-pin engaged in said piston, and a crank-pin carried by a crank shaft; a connecting rod arranged to operatively connect said wrist-pin and crank-pin and comprising forked end portions arranged to respectively span said pins, guideways arranged between the opposite portions of each of said forks, half-bearings arranged to be fixed at the ends of the respective forked portions nearest said crank-shaft, half-bearings slidably engaged in said guideways and arranged to cooperate with said first half-bearings to provide bearings for said pins, and means arranged for the adjustable positioning of said slidable half-bearings from the direction of the head end of said rod.

3. In combination with a reciprocable piston, a wrist-pin engaged in said piston, and a crank-pin carried by a crank-shaft; a connecting rod arranged to operatively connect said wrist-pin and crank-pin and comprising adjustable and removable bearings for the respective pins mounted at opposite ends of the rod, and means extending through said rod for effecting adjustment of the crank-pin bearing from the head end thereof.

4. A connecting rod arranged to operatively connect a wrist-pin and crank-pin and comprising forked end portions arranged to respectively span said pins, guideways defined by and between the opposed portions of each fork, half bearings arranged to be fixed at the inner ends of the respective forks, half-bearings slidably engaged in said guideways and arranged to cooperate with said first half bearings to provide bearings for said pins, and means arranged for independently effecting the adjustable positioning of said slidable half-bearings from the direction of the head end of said rod.

5. A connecting rod arranged to operatively connect a wrist-pin and a crank pin and comprising a forked end portion arranged to span one of said pins, and defining a longitudinally disposed guideway between the opposed portions thereof, a half-bearing arranged to be fixed at an end of said guideway, and a second half-bearing slidably engaged in said guideway and arranged to cooperate with said first half-bearing to provide a bearing for said pin, a bearing for the other of said pins and means operable through said rod from said last bearing to effect the adjustable positioning of said slidable half bearing independently of any adjustment of said other bearing.

6. A connecting rod arranged to operatively connect a wrist-pin and a crank pin and comprising a forked end portion arranged to span one of said pins, a longitudinally disposed guideway defined by and between the opposed portions of said fork, a half-bearing arranged to be positioned at an end of said guideway, a second half-bearing slidably engaged in said guideway and arranged to cooperate with said first half-bearing to provide a bearing for said pin, a bearing for the other of said pins, and means arranged to effect the adjustable positioning of one of said half-bearings with respect to the other from the head end of said rod and independently of any adjustment of said second bearing.

7. A connecting rod arranged to operatively connect a wrist-pin and a crank-pin and provided with adjustable bearings for the crank pin, and means extending interiorly through the length of said rod for effecting adjustment of the crank-pin bearing from the head end of the rod.

8. A connecting rod arranged to operatively connect a wrist-pin and a crank-pin and provided with adjustable bearings for the wrist-pin and crank pin, said rod being provided with a longitudinal perforation in which means may be inserted for adjusting said crank-pin bearing from the wrist-pin end of said rod independently of any adjustment of said wrist pin bearing.

9. In combination with a piston having a wrist-pin and having a head portion thereof removable, a connecting rod having a longitudinally extending guideway provided at an end thereof, bearing segments slidably engaged in and longitudinally removable from said guideway and arranged to cooperate to provide a bearing for said pin, and means operable through the head end of said piston when said head portion is removed for adjusting said bearing.

10. In combination with a piston having a wrist-pin engaged therein, a connecting rod having its head end formed as a fork and having opposed portions arranged to span said wrist-pin and define a longitudinally disposed guideway therebetween, and a bearing slidable engaging in said guideway and having defined therein a bore in which said wrist pin is arranged to be disposed.

In testimony whereof, I have hereunto set my hand at Oakland, California, this 20th day of April, 1925.

JOHN C. LEARY.